Sept. 17, 1968     I. J. D'AGATI     3,401,786
COLLAPSIBLE TRIPPER TRAILER
Filed Feb. 28, 1967     3 Sheets-Sheet 1
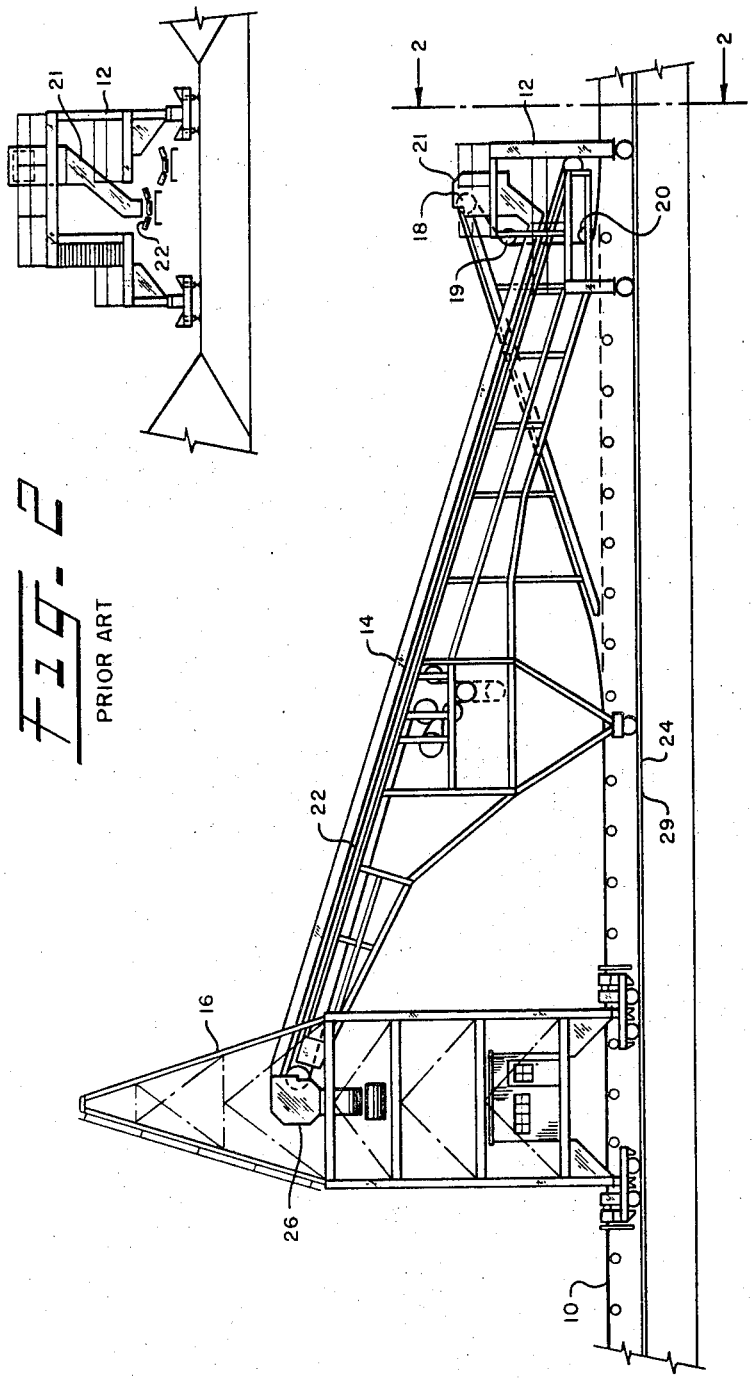
INVENTOR.
IGNAZIO J. D'AGATI
BY
John L. Shortley
ATTORNEY

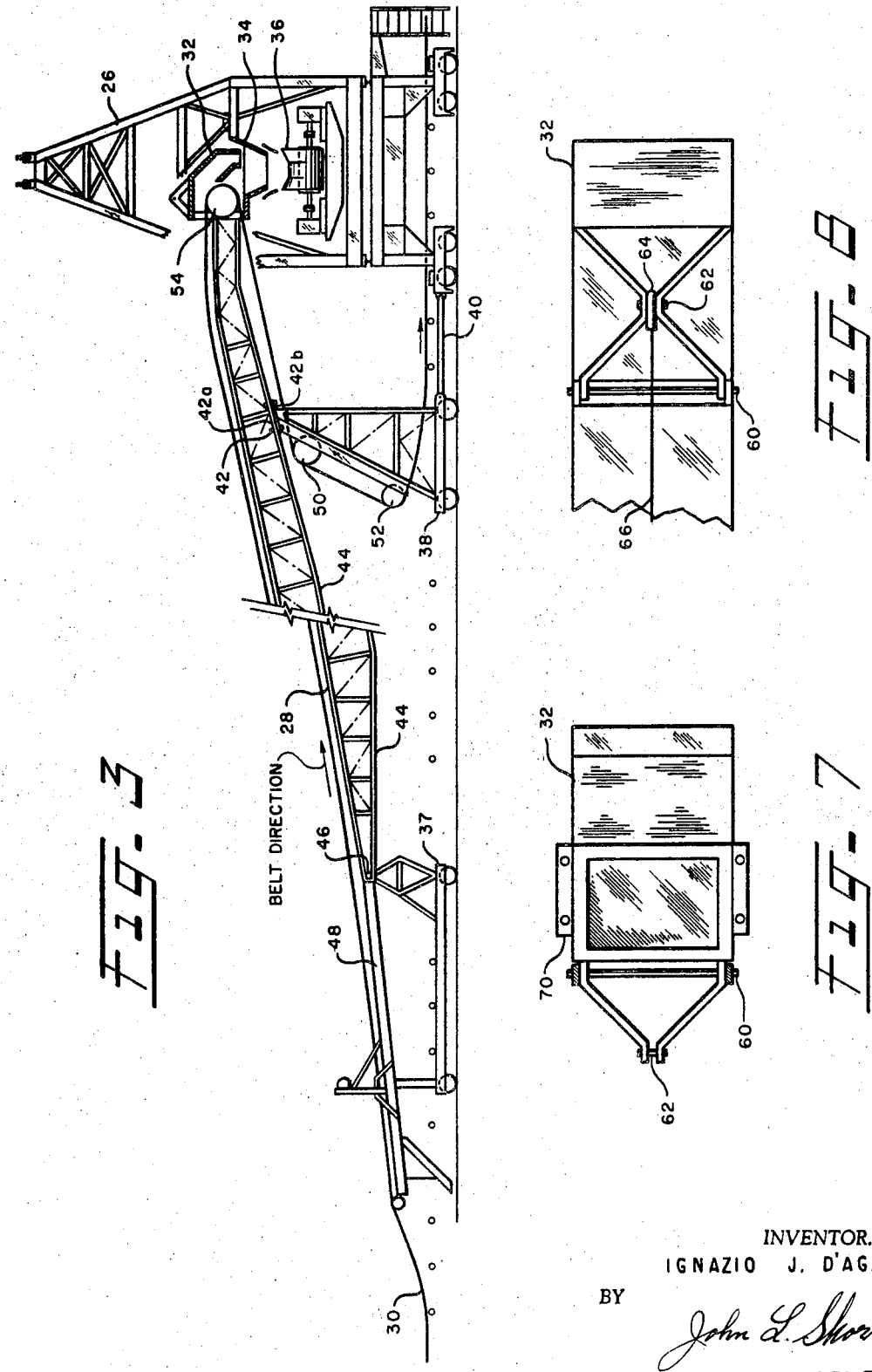

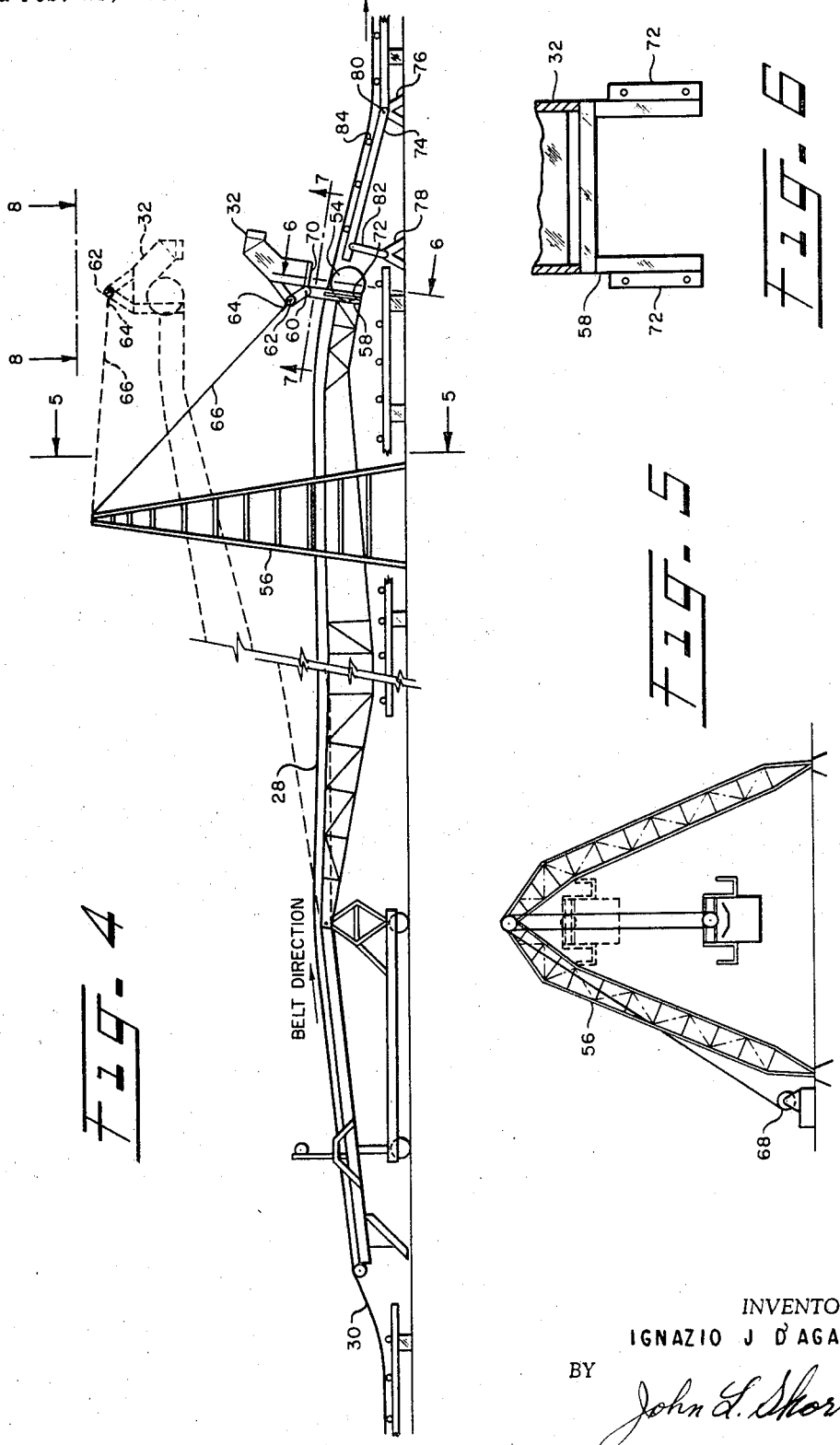

United States Patent Office 3,401,786
Patented Sept. 17, 1968

3,401,786
COLLAPSIBLE TRIPPER TRAILER
Ignazio J. D'Agati, Pines Lake, N.J., assignor to Hewitt-Robins Incorporated, Stamford, Conn.
Filed Feb. 28, 1967, Ser. No. 619,305
4 Claims. (Cl. 198—36)

ABSTRACT OF THE DISCLOSURE

The invention pertains to a tripper trailer for a bulk material stacker which has a section for elevating the belt and the conveyed material up to the stacker boom conveyor. According to the invention the elevating and tripping section of the tripper trailer can be moved out of association with the stacker boom conveyor and then lowered to approximately the level of the belt conveyor with which the tripper trailers is associated. Bulk material on the latter conveyor can then continue along the conveyor over the elevating and tripping section without being elevated or tripped by the tripper trailer. Thus, there is provided a tripper trailer the tripping function of which can be bypassed while it still carries the loader belting of the conveyor it is associated with.

Belt conveyor trailers and trippers, in conjunction with stacking devices, are often used for stacking or depositing quantities of bulk material in beds or piles of bedding and/or reclaiming systems. It is customary in such bedding and reclaiming systems to employ main conveyors, sometimes referred to as bedding and/or reclaiming conveyors over which the material is carried to and from the beds. Sometimes a single conveyor serves both purposes.

The material flow and the conveyors by which bedding and reclaiming are accomplished are arranged so that the material first moves over a bedding conveyor to a stacker and into the beds or piles. Then, as needed, the material is reclaimed, i.e. picked up from the piles by a reclaiming machine and placed onto the reclaiming conveyor. On occasion, due to material needs at the time, it is desired that the stacking (bedding) and reclaiming operations be bypassed. However, it is not desirable that the separate standby conveyor be provided just for this purpose.

In known installations either a single device called a tripper-trailer which functions as an elevating device and a tripper or a separate trailer and a separate tripping device are employed. In those installations in which the material can be fed in directly over the trailer and then into the hopper on the stacker and from the latter onto the stacking boom, a separate tripping device is not needed as the tripper is provided as a part of the trailer. Such a device, as might be expected, is termed a tripper trailer. In some installations however, it is found desirable to employ a separately supported tripping device which feeds onto a trailing member. The latter in turn is supported by its own system of wheels, or if in part supported by the tripper it is often detachable therefrom. In the latter installation the tripper is designed to cooperate with the main bedding and reclaiming conveyor and the trailer has a separate independent conveyor. The tripper feeds through a hopper onto the trailer conveyor and the latter then elevates the material conveyed to the hopper on the stacking device.

In some installations of these systems it is also desirable to employ a mean for bypassing the trippers, trailers, and stackers. It has been proposed, for example, to provide an installation in which there is a separate trailer with its own conveyor and a separate collapsible tripping device. The tripper can be collapsed so that the tripping function can be discontinued. When the tripper is collapsed material will not be fed to the trailer conveyor. Then the bedding or the dual bedding and reclaiming conveyor can be operated to move the material past the tripping device without it being removed and placed into a storage pile. Of course, it is known that with a separate tripping device the tripper can be simply employed without discharging the material to one side. This can be accomplished by a suitable bypass chute arrangement. Material on the bedding and reclaiming conveyor will be tripped off the conveyor but will then be directed back onto the latter conveyor. In certain installations the latter arrangement is more desirable than in others. However, this results, during bypassing operation, in a useless material "transfer point." Transfer points are generally undesirable and only ordinarily permitted where absolutely necessary, such as in tripping (transferring) for a purpose such as stacking.

When friable material is conveyed, the need to eliminate transfer points is even more imperative. The material will be degraded by each transfer. For this reason the separate tripping devices, supra, that can be collapsed and placed completely out of service have been suggested for some installations. In such an arrangement a separate trailer arrangement is used, and when the tripper is collapsed and removed the trailer conveyor will receive no more material from the tripper and the tripper will cease to function. However, even this has certain disadvantageous aspects. The use of a tripper itself in conjunction with a trailing conveyor requires a first transfer point from the tripper to the trailing conveyor and then a second transfer point from the trailing conveyor to the stacker when stacking is being accomplished, i.e., an extra material transfer as compared to the combination tripper trailer. Thus, even though the tripping function can be eliminated by collapsing the tripper and material can be passed straight through the system without stacking, thus eliminating a transfer when no stacking is desired, whenever there is stacking occurring there will be a double transfer. Furthermore, the need for a separate collapsible tripping device requires additional structure, such as, pits to clear the tripper trailer head pulley from the main belt line. This arrangement also requires movable main line idlers and additional structural elements in the conveyor structure itself. Further, it requires additional power for driving the separate trailer conveyor.

An object of my invention is to provide a system wherein straight-through flow of the materials can be accomplished without use of a transfer point and wherein a separate tripper is unnecessary and yet only a single transfer point is added during stacking.

A further object of my invention is to reduce the dead load of the structural elemens needed to support the trippers and trailers in association with stacking devices.

Still a further object is to reduce the power required for traversing the equipment and for the conveyor drives.

Still another object of my invention is to provide a trailer arrangement which is collapsible yet remains in the main belt system during straight-through flow of the material past the stacking device.

Still another object of my invention is to provide an arrangement of trailer and main belt line idling devices which can be associated for operation with the tripper collapsed with the minimum amount of delay and through employment of the minimum amount of structural elements. A similar object of my invention is to provide a trailer which is used in the normal manner to elevate the main belt and then trip the material onto the hopper when stacking is desired, yet which can be lowered into position over a portion of the main belt line idlers and into association with a movable section of the main belt line idlers for continuous smooth traversing of the material over the trailer when it is in a non-elevating position and when material is bypassing the stacker.

Still another object of the invention is to provide a means for lowering and raising the tripper trailer head pulley into and out of association with the main line idlers of a conveyor.

Still another object of the invention is to provide a hopper device functioning in association with the head pulley of the trailer conveyor; i.e. the tripping pulley, during stacking operations which remain part of the trailer and yet which is movable out of association with the tripper head pulley for positioning of the trailer conveyor section in straight line relationship with the main line idlers.

Still another object of the invention is to provide an arrangement of bend pulleys forming part of the tripping apparatus whereby belt can be placed into the reverse path needed during the tripping of material into the stacker hopper and yet the belt can readily be placed onto bearing relation with the main line conveyor idlers and the material can flow past the bend pulleys when the trailer tripping pulley is lowered into association with the main line idlers.

These and other objects and advantages will become apparent from the following description and the accompanying drawings wherein:

FIGURE 1 is a fragmentary side elevational view of a known combination of a stacker, a trailer and a tripper in association with a main bedding and reclaiming conveyor;

FIGURE 2 is a fragmentary elevational view taken along line 2—2 of FIGURE 1;

FIGURE 3 is a side elevational view of a combination of a stacker, a trailer, a trailer wagon, and a stacker wagon, without a separate tripper, according to the invention, and showing the relative position of the elements during stacking operations;

FIGURE 4 is a side elevational view showing the trailer of FIGURE 3 in a lowered position and in association with a hoist tower;

FIGURE 5 is a sectional view taken along line 5—5 of FIGURE 4;

FIGURES 6, 7 and 8 are various views of a tripper chute and a pintle connection taken along lines 6—6, 7—7 and 8—8 respectively, of FIGURE 4.

Piles of bulk material can be a substantial size; for example, 250,000 short tons per pile. Where it is necessary to employ a separate tripping device and a separate trailing conveyor it is apparent that all this material must be elevated to the tripper pulley, then discharged downward through a chute and then re-elevated that same distance plus an additional distance up to the stacker and there re-tripped and fed through a chute. It is well known to those skilled in the art that it is desirable, if at all possible, to eliminate transfers and repetitive elevation wherever possible. Every foot of elevation means horsepower.

In FIGURE 1 reference character 10 indicates the bedding and reclaiming conveyor; 12 is the tripper; 14 is the trailer; and 16 is the stacker.

The main bedding and reclaiming belt traverses the pulley 18 of the tripper and then the customary bend pulley 19 and 20. The material is tripped off and directed through the chute 21 onto the conveyor 22 of the trailer 14. As known in the art, the stacker, trailer and tripper are provided with wheels which ride on rails 24 extending along the pile area. Material flows over the head pulley of the trailer conveyor 22 into the chute 26 and then onto the stacking booms in a manner known to the art.

It is customary to associate a trailer and stacker so that they can be disconnected from one another. The stacker can then be moved over the ends of the bedding and reclaiming conveyor and completely disassociated therefrom. This is for the purpose of traversing the stacker to another pile arrangement wherein it will be moved into association with another tripper-trailer, a trailer and tripper and main conveyor. It is also customary to utilize the power drive on the stacker as the traversing drive for the trailers and trippers and not to provide separate drive means. Suitable links are used to interconnect the stacker, tripper and trailer, or the tripper-trailer so that they will be moved along by the stacker.

While FIGURES 1 and 2 show a stacker trailer and tripper which have common structural elements, it has been from time to time suggested to make these elements separable. In one instance it has been proposed to design the tripper so that it can be collapsed and removed from its association with the belt conveyor 10. When this is done, of course, material coming along the conveyor 10 will simply pass along without going up the trailer.

According to the instant invention, however, the trailer can be lowered with respect to the main line conveyor and the stacking function and the tripping function can be eliminated by this method. When this is done the material will also simply flow along the main line conveyor without being stacked.

Referring now to the FIGURES 3, 4 and 5: There is therein illustrated a stacker 26 and a tripper-trailer 28 associated in such a manner that material coming along the conveyor 30 will be elevated onto the trailer and the belt will then be momentarily reversed, resulting in a tripping of the material off the belt and into the chute 32. From there the material will fall into the hopper 34. From the hopper 34 it in turn will fall onto the conveyors 36 mounted on the booms of the stacking device.

It is well known in the art that in the arrangement illustrated in FIG. 3 the tripper-trailer moves along with the stacker and in association with it in such a manner that the belt is picked up off the main conveyor idlers directed up the trailer around the tripper pulley, over the bend pulley and, as the tripper-trailer and stacker pass along the belt, it is then lowered down on to the main line idlers. This scheme has been used in the art for many years. Accordingly details of the idlers and stands, etc. of the main conveyor and the idlers on the trailer are not illustrated or described herein.

According to the invention the tripper-trailer comprises a trailer wagon 37 and a stacker wagon 38 which are associated with the stacker and its tripper-trailer. In this instance the stacker wagon, however, is removably associated with the trailer, whereas in the normal instance what is herein referred to as the stacker wagon is usually made integral with the trailer. The stacker wagon is associated with the trailer by means of removable bolts 42 extending through the mating plates 42a and 42b. Further, it should be noted that the tripper-trailer comprises a pivoted section 44 which is attached by the pivot pin 46 to the trailer wagon upper beam 48.

The bend pulleys 50 and 52 are mounted on the stacker wagon. The trailer 44 supports the usual idlers, as well as the head pulley or tripper pulley 54. As is obvious to those skilled in the art, the belt moves over the head pulley 54 and around the bend pulleys and back into association with the main line idlers. As the trailer moves along with the stacker a different section of the belt is picked up off the idlers and then is passed over the trailers and around the bend pulleys and is laid back down onto the main line idlers. The trailer wagon, stacker wagon and stacker are supported on rails which are placed to the sides of the idlers and their supporting structure (see FIGURE 2).

It will be apparent that by a simple method of unbolting i.e. uncoupling the connection between the stacker wagon and the trailer and moving the stacker wagon with its bend pulleys to the right while the trailer is moved relatively to the left, the pulley 54 will move out of association with the chute 34. When this movement is carried along far enough the trailer section 44 can be pivoted down till the head pulley 54 is substantially at the elevation of the main belt line idlers. The chute 32 is designed so it can be pivoted upwardly above pulley 54 to facilitate positioning the pulley 54 at this level.

According to the invention this is all accomplished in the following manner: The stacker drives the trailer and the stacker wagon to a point at which the trailer is under a hoist tower 56. This, as will be obvious to those skilled in the art, is placed at a location near the incoming end of the pile area so that the stacker need not pass by the hoist tower.

According to the invention the chute 32 is pivotally mounted on support frame 58 by pin 60. Also a projecting member, in this case a pintle 62, is fixed to the chute in such a manner that it can be engaged by a hook 64 connected to a cable 66. The latter is passed over suitable pulleys to a hoist 68 adjacent the hoist tower 56. It is apparent that with the stacker and trailer and stacker wagon in the proper position with respect to the hoist tower the hook 64 can be hooked over the pintle 62. The chute 32 has a base flange 70 which cooperates with mating flanges 72 on the frame 58 fixed to the end of the trailer boom. Fastening devices are employed to connect the mating flanges to maintain the chute in the operating position illustrated in FIGURE 3. This is the position in which the chute receives material from the pulley 54 and directs this material downwardly into the hopper.

It is apparent that by unbolting the flanges 70 and 72 and unbolting the plates 42a and 42b connected by the bolts 42, and then operating the hoist 68, the chute will be rotated and then the trailer section 44 will be elevated out of association with the stacker wagon as the cable 66 is drawn in. The chute will be rotated from the solid line position illustrated in FIGURE 3 and in dotted lines in FIGURE 4 into the position illustrated in solid lines in FIGURE 4. When the load at the trailer section 44 is taken up by the hoist the stacker 26 and stacker wagon 38 can be moved out of association with the trailer boom section 44. As this occurs, of course, the belt will move away from the bend pulleys.

Once the trailer and stacker wagon have been moved sufficiently to the right as illustrated in FIGURE 3, the cable hoist 68 can now be operated so as to lower the trailer boom. The take-up of the conveyor, as will be known in the art, will function to take up slack of the belt. Thus as the boom is lowered the belt will move into association with the main line idlers.

Furthermore, according to the invention, there is provided in the main belt line a pivoted idler support section 74. This comprises a pair of side rails pivotally connected at one end to a stand 76. At their opposite ends the side rails are adapted to be supported in either of two positions—one with the rails in direct connection to a stand 78 similar to stand 76 and pinned thereto, and in another the rails 74 are adapted to be pivoted upward about the pivot point 80 on stand 76. When this is accomplished links 82 are inserted and connected by suitable pins at their ends to the pivoted section 74 and to the stand 78 in such a manner as to support the side rails of section 74 and the connected idlers at an angle with respect to the normal line of the belt. It will be apparent that by selecting the length of the links 82 and the length of the side rail section 74 properly the arrangement can be such that the head pulley 54 can be lowered into close association with the side rails 74 and the main belt can flow smoothly over pulley 54 onto the idlers 84 on the pivoted side rail members forming the section 74. When the links 82 are raised a transition is provided in the conveyor. The transition will insure the passage of the material over the head pulley and back onto the main line idlers without slippage.

It is apparent that the material can now flow freely over the trailer and back along the main belt line idlers without being elevated and tripped off. The stacker wagon and stacker can now be traversed from one pile location to another and placed in association with other trailers and main belts as is well known in the art.

It will be seen that the chute 32 remains out of association with the head pulley 54 and does not interfere with the operation of the system when the trailer boom is lowered. Yet when the hoist apparatus is again operated to raise the trailer the chute will automatically swing back into proper association with the pulley 54 after the bend pulleys 50 and 52 have been placed in association with the belt and the stacker wagon and trailer boom are connected, and the cable is relaxed. The cable can be connected to and removed from the pintle by an operator standing on a walk of the kind usually provided on trailers, as will be obvious to those skilled in the art.

It is apparent from the above that I have provided a simple means for accommodating a stacker and belt elevating means and a tripping arrangement for passing material from the main belt line to a stacker, together with a means for rendering the tripping means inoperative. This can be accomplished by simply raising and lowering of a boom without the need for disassembling of structures other than disconnecting independent sections and without the need for pits in which a tripper trailer can be lowered, etc.

While a preferred form of the invention has been described, it will be understood by those skilled in the art that many forms of the invention may be made within the scope of the appended claims, and accordingly I claim an exclusive right to all which come within the scope of the appended claims.

I claim:

1. In a combination of a belt conveyor having a belt with a load carrying run and a tripper trailer associated with said conveyor, designed to elevate said belt and trip material thereon, said tripper trailer comprising a trailer wagon, a trailer section connected to said trailer wagon, said trailer section having belt supporting means and a head pulley over which said belt is adapted to move for tripping purposes, and a stacker wagon supporting a bend pulley means in association with said head pulley and also supporting one end of said trailer section in an elevated position, and means associated with said stacker wagon for connecting said stacker wagon to a stacker, the improvement wherein said trailer section is pivoted to said trailer wagon and said stacker wagon is removably connected in supporting relation to said pivoted trailer section, at a point spaced from said trailer wagon, and there are means on said pivoted trailer section for connecting it to an elevating and lowering device for supporting one end of said pivoted trailer section when said supporting stacker wagon is removed from supporting relation thereto.

2. The combination of claim 1 including a hoisting and lowering device and wherein the latter device comprises a hoisting and lowering means adapted to support said pivoted trailer section and lower it until its head pulley is at en elevation approximately that of the load carrying run of said conveyor.

3. The combination of claim 2 including means forming part of said conveyor adapted to locate a portion of the idlers of the latter conveyor in substantial alignment with said head pulley so as to form a transition for the belt of said conveyor from said trailer section and back into the run of said conveyor without tripping of material off said conveyor when said head pulley is at said approximate elevation.

4. In combination a belt conveyor, a stacker, and a tripper trailer, said tripper trailer having a pivoted section along which the conveyor belt is supported, said section supporting a head pulley over which the belt passes, said stacker including a wagon normally supporting said pivoted section, but being removably connected thereto, said stacker being connected to said stacker wagon and said stacker wagon being connected to said trailer pivot section so that said stacker can move said trailer, said stacker wagon and stacker along said belt conveyor, a hoisting device positioned adjacent said conveyor, said stacker being operable to move said trailer adjacent said hoisting device, said hoisting device having means connectable to said trailer pivot section for supporting the latter, means for disconnection of said stacker wagon from said trailer pivot section, said hoisting device being operable to support the weight of said trailer pivot section whereby said stacker wagon and stacker can be moved independently away from said trailer and said trailer pivot section, when the latter is supported by said hoisting device, said hoisting device being operable to lower and raise said trailer pivot section, said belt conveyor comprising an idler section having movably supported side rails, said side rails being operable from a first position in which they are in alignment longitudinally with the run of said belt conveyor to a second position in which one end of said section is elevated to form a sloped section in said conveyor, said pivotal section of said side rails being positioned with respect to said hoisting device such that when said trailer pivot section is lowered and said side rails are in said second position, said trailer head pulley will move into close association with said idler section and the conveyor belt will pass substantially uniformly over said head pulley and onto the idlers of said idler section.

References Cited

UNITED STATES PATENTS 3,348,662   10/1967   Pradon _____ 198—186

EVON C. BLUNK, *Primary Examiner.*

R. J. HICKEY, *Assistant Examiner.*